United States Patent [19]

Matsubara et al.

[11] Patent Number: 5,797,055
[45] Date of Patent: Aug. 18, 1998

[54] FOCAL PLANE SHUTTER AND METHOD FOR PRODUCING SAME

[75] Inventors: Takashi Matsubara; Masanori Hasuda, both of Yokohama, Japan

[73] Assignee: Nikon Corporation, Tokyo, Japan

[21] Appl. No.: 675,868

[22] Filed: Jul. 5, 1996

Related U.S. Application Data

[63] Continuation-in-part of Ser. No. 498,766, Jul. 6, 1995, abandoned.

[30] Foreign Application Priority Data

Jul. 6, 1994 [JP] Japan ................................ 6-177593
Oct. 20, 1994 [JP] Japan ................................ 6-281359
Jul. 5, 1995 [JP] Japan ................................ 7-194162

[51] Int. Cl.⁶ .................... G03B 9/28; G03B 9/36; G03B 9/40
[52] U.S. Cl. .................... 396/484; 396/488; 396/490; 396/491; 396/492
[58] Field of Search .................... 354/241–260; 395/452, 471, 483, 484, 488, 490, 491, 492, 497

[56] References Cited

U.S. PATENT DOCUMENTS 4,482,231 11/1984 Kato et al.
4,775,583 10/1988 Kawamura.
4,965,617 10/1990 Matsubara.
4,992,813 2/1991 Matsubara.
5,202,715 4/1993 Matsubara.
5,323,205 6/1994 Matsubara et al.
5,508,773 4/1996 Miyazaki et al. ................ 354/246
5,526,091 6/1996 Sakagami ......................... 354/431
5,543,880 8/1996 Matsubara et al. ............... 354/252

FOREIGN PATENT DOCUMENTS

59-61827 4/1984 Japan.
3-68928 3/1991 Japan.

Primary Examiner—J. R. Scott
Assistant Examiner—Daniel Chapik
Attorney, Agent, or Firm—Oliff & Berridge, PLC

[57] ABSTRACT

An extremely durable, super-high speed shutter with speeds of 1/8000 second or faster advantageously increases the blade acceptance rate, reduces the cost, prevents abnormalities such as light leaking between the curtains and the like, contributes to the implementation of a super-high speed shutter with speeds exceeding 1/8000 of a second, corresponding to TTL multi-pattern light adjustment, and the like. The shutter includes a front curtain and a rear curtain each including a plurality of dividing blades; and at least one of the dividing blades among the front curtain and the rear curtain that is positioned on the photo lens side is formed from a black material having at least one uncoated surface.

30 Claims, 6 Drawing Sheets

FOCAL PLANE SHUTTER AND METHOD FOR PRODUCING SAME

This application is a continuation-in-part of Ser. No. 08/498,766, filed Jul. 6, 1995, now abandoned.

BACKGROUND OF THE INVENTION

1. Field of the Invention

The present invention relates to a vertically traveling focal plane shutter that is applied to a camera and a method for producing the same.

2. Description of Related Art

In conventional "through the lens" (TTL) photometry, when the light is adjusted for strobe photography, because the content in specified areas of the film covered by light receiving elements is averaged and the strobe is controlled so that the exposure light amount will become a uniform level, there are large differences in photographic results, depending on the condition of the object.

For example, on cameras in which the range covered by light receiving elements is the entire film surface, when strobe photography is carried out with a small primary object in the center of the field with a wide, open background, because there is a wide area from which the strobe light does not reflect and come back, the regulated amount of emitted light will be enough to overexpose the primary object. When an object with a high rate of reflection, such as a gold folding screen, stands directly behind the primary object, the regulated amount of emitted light will result in underexposure.

In order to resolve these problems, a TTL automatic light adjustment controlling device (Japanese Laid-Open Patent Publication Hei 3-68928) has been proposed as a means to control the differences in exposure of the primary object that result from differences in the position of the object and reflectivities of the object during strobe photography.

In areas which cover the film surface, this device divides the object field into a central area and multiple peripheral areas. The device has a plurality of photoelectric conversion means which are capable of carrying out photometry. The device emits a preliminary strobe directly before the focal plane shutter opens, catches the light that the object image formed by this light being reflected from the shutter curtain surface by means of the plurality of photoelectric conversion means, and detects the values that result from the individual analyses of these outputs as the object field reflection rates of each area through the emitted strobe light. By performing an overall mathematical processing of the object field reflection rate information detected for each area, a weighing can be determined for each divided area that will result in the proper exposure for the primary object.

Next, the main strobe light is emitted directly after the shutter opens. As described above, the light reflected by the film is caught by the plurality of photoelectric conversion means, a predetermined weighing is carried out on the outputs, and the weighted outputs are added and integrated. The emission of the strobe light is stopped with a timing that is determined by comparing the integrated value with a specified value, and the light adjustment of the main light emission ends. This type of light adjustment is called TTL multi-pattern light adjustment.

Because it is necessary for the reflection rate of the shutter curtain surface to be virtually the same as the film surface in order for a conventional focal plane shutter to correspond to the TTL automatic light adjustment controlling device described above, a white (or grey) coating is applied in order to increase the reflectivity of the shutter curtain surface.

In recent years, due to demands for improvement of film sensitivities and new image expressions, it has been necessary to move toward higher speeds in camera shutter speeds and strobe alignment speeds, and cameras have actually been realized with shutter speeds as fast as $1/8000$ second and alignment speeds as fast as $1/250$ second.

With this type of focal plane shutter, fast shutter speeds that exceed the strobe alignment speed are realized by beginning to move the front curtain (or blind) and rear curtain (or blind) with the timing shifted, and carrying out gap (or slit) exposure with the gap between the first blade of the front curtain and the first blade of the rear curtain being fixed at a certain gap, or with the gap being varied according to the speed. The shutter includes four or five dividing blades (light shielding blades) and a driving mechanism that drives these blades. The material from which the light shielding blades are formed can be fiber reinforced plastic (referred to hereafter as FRP), aluminum, or the like, or combinations of the above can be used, such as, when four blades are used, the two blades with the greatest amount of movement can be formed from FRP, while the two blades with the least amount of movement can be formed from aluminum.

FRP, as introduced in Japanese Laid-Open Patent Publication Sho 59-61827, uses carbon fibers aligned in one direction as the reinforcing fibers, and uses epoxy resin as the matrix resin. FRP has multiple layers of prepreg sheets, which are intermediate products. The direction of the fibers of each sheet is perpendicular or virtually perpendicular to that of the sheets on either side. FRP is manufactured by pressing all the prepreg layers together and applying heat to cause hardening. FRP material that has been thus manufactured is cut into the desired light shielding blade shape. The cutting is generally done by stamping with a press.

Blades made from FRP are lightweight and have a high bending rigidity even at high shutter speeds of $1/8000$ second, because shaking of the blades during traveling and directly after stopping is extremely small. Even if the next shutter action is carried out while the blade is shaking, the blade will not collide with or damage the other blades or shutter base plate (the device that determines the field angle). Additionally, the shutter will not become inoperable, and it becomes possible to achieve an extremely high durability. (Even if FRP blades encounter temporary shaking, the shaking condition is quickly absorbed, when compared, for example, to an aluminum-type blade.)

However, the diameter of the carbon fibers is 3 to 8 μm, and if the alignment is bad, there will be localized increases or decreases in the number of fibers, causing non-uniformity in strength and irregularities in the flatness. In addition, there are blades that will warp for some reason or another when used for extended periods of time. Because these types of blades have large variations in thickness, they are discarded in advance during manufacturing. Blades that look outwardly inferior are also discarded, such as those that have experienced failures in layering or which have scratches or the like. Furthermore, a number of blades warp when a coating is applied. These warped blades are also discarded. Thus FRP-type blades are extremely time consuming from the standpoint of quality control, and the acceptance rate is low. In other words, the current situation is such that FRP-type blades are extremely expensive.

In the case of aluminum-type blades, because rejects and problems in quality control are extremely small when compared with FRP, aluminum blades have the cost advantage over FRP, but the weight of the blades becomes fairly heavy, and not only does the charge energy have to be increased, but shaking during traveling and directly after stopping is extremely large. Moreover, because the shaking condition is not easily absorbed, the durability is markedly inferior to that of a shutter with FRP-type blades.

Thus, improvements in dividing blades are needed. It has become known that the functioning of recent shutters have the following problems.

Namely, at high shutter speeds of 1/8000 second or faster, because scraping of the blades against themselves or between the blades and the intermediate plate and/or spacer plate occurs through the high speed traveling of the blades, the coating of the surface on one blade, the intermediate plate, or the spacer plate can peel off and stick to the surface of another blade, adding another layer of coating. After this powder coating sticks as an extra layer, the powder is polished by the rubbing together of the blades, and is caused to shine. The coating is originally satin finished, and prevents light from leaking between the curtains, but because of membrane thickness increases due to variations in the surface and the addition of an extra layer, there is a danger that light may leak between the curtains. Even if the number of durability cycles is increased, this is a serious problem that must be resolved if functionality is to be maintained. There are differences in the extent of this phenomenon. Indications of this phenomenon can be tested for before shipment. However, a problem still remains in that blades are discarded as rejects upon failing the testing just prior to shipping, and the rejects currently constitute a substantial loss.

Thus, the present situation is that improvements are needed for current shutters than can achieve speeds of 1/8000 second, and, even more recently, even faster superhigh speed shutters are being requested which have speeds exceeding 1/8000 second. In order to answer these demands, it is necessary to improve the blade components that are to be driven, namely by making these blade components lighter and stiffer.

For example, it is conceivable that the blades could be made thicker in order to provide the rigidity necessary for traveling at high speeds. But if this is done, the existing shutter blade chamber (the space in which the blades, arms, and the like travel) becomes too narrow and, according to the camera, the size of the shutter must be increased. Ultimately, it becomes very difficult to use the shutter without changing the design of the entire camera. In other words, it becomes very difficult to increase the functionality by changing only the blades.

SUMMARY OF THE INVENTION

The present invention has been conceived in light of the problems stated above, and has several objects including providing, easily and at low cost, an extremely durable, super-high speed shutter faster than 1/8000 second by increasing the acceptance rate and decreasing the cost of the FRP; resolving the problem of light leaking between the curtains; increasing the rigidity and decreasing the weight of the blade components; and providing a shutter adaptable to TTL multi-pattern light adjustment.

In order to accomplish the above and other objectives, a focal plane shutter in accordance with a first aspect of the present invention is disclosed which comprises a front curtain and a rear curtain that each include a plurality of dividing blades, wherein at least one of the dividing blades of the front curtain or the rear curtain that is positioned on the photo lens side is formed from a black material having at least one uncoated surface that can be exposed. Accordingly, an uncoated blade may be formed on 1) the front curtain; 2) the rear curtain; or 3) both the front and rear curtains.

According to a second aspect of the invention, a focal plane shutter is disclosed having a front curtain and a rear curtain each including a plurality of dividing blades, wherein at least one of said dividing blades among said front curtain and said rear curtain positioned on a film side of a camera is formed from a black material, said at least one dividing blade has a first surface facing the lens side of the camera and a second surface facing the film side of the camera, and at least one of said first surface and second surface is uncoated.

According to a third aspect of the invention, a focal plane shutter is disclosed having a front curtain with a plurality of front dividing blades and a rear curtain with a plurality of rear dividing blades, said front and rear dividing blades being arranged for movement toward and away from one another to form an exposure gap between the front and rear curtains, wherein at least one of the dividing blades among said rear dividing blades and said front dividing blades is formed from an uncoated black material.

According to a fourth aspect of the invention, a method for producing a focal plane shutter is disclosed having front and rear curtains, each said curtain including a plurality of dividing blades, the method comprising: forming at least one of said dividing blades among said front curtain and said rear curtain that is positioned on a photo lens side of a camera from a black material having at least one uncoated surface; and assembling the blades into the respective front and rear curtains.

On the focal plane shutter with the structure described above, since, for example, the coating is eliminated from a lightweight, highly rigid FRP-type blade, the weight is further reduced, and since the coating process is reduced and warping defects that occur during the coating of the FRP are eliminated, a large-scale reduction in cost is achieved. Furthermore, since the coating with a thickness of 10 μm is reduced on the blades, the thickness of the FRP can be increased by that amount, making it possible to increase the rigidity and to markedly increase the durability of a high speed shutter with speeds of 1/8000 second and faster.

It is particularly effective to decrease the weight of the blades which have the first through third largest amounts of movement among the dividing blades, and to increase the rigidity of these blades. In this case, through increasing the thickness of the FRP, not only are warping defects that occur at the time of coating eliminated, but warping of the blades prior to coating decreases, the acceptance rate improves, and a large-scale reduction in cost is achieved.

Also, concerns about light leaking between the curtains disappear because a second coating is not inadvertently applied, and it becomes possible to stably maintain the functionality even if the number of durability cycles increases. Moreover, extremely large reductions in cost can be achieved because situations can be prevented in which defects are first discovered upon the initial operation just prior to shipping. In addition, it becomes possible to deal with problems in the external appearance and with TTL multi-pattern light adjustment.

BRIEF DESCRIPTION OF THE DRAWINGS

The preferred embodiments are described with reference to the drawings in which.

DETAILED DESCRIPTION OF PREFERRED EMBODIMENTS

In order to correspond to TTL multi-pattern light adjustment, it is necessary to apply a white or grey coating on the photo lens-side blade surfaces of either the front curtain or the rear curtain, and to apply a black coating on the film-side surface in order to prevent light from leaking between the curtains. It has been discovered that no coating inadvertently occurs between these two coatings, and that the danger of an undesired coating is decreased when different types of coating are used. It has also been discovered that when rubbing occurs between a blade with an uncoated surface that has become bare and a coated blade, or between a blade and the intermediate plate or the spacer plate, a second coating will not form on the un-coated blade, even if the coating applied to the other blade or to the intermediate plate or spacer plate peels off.

Furthermore, with conventional coatings, there is the problem of giving a neat appearance to the blades that will actually be seen by the user, and black coatings are applied even if the camera does not correspond to TTL multi-pattern light adjustment. In addition, black coatings are applied to the curtains positioned on the photo lens side for the following reasons: light leaking between the curtains, moveability, friction durability, and the like. However, in these cases, only the curtains positioned on the film side and actually seen by the user are coated, and it has been discovered that there are no problems with light leaking between the curtains, moveability, friction durability, and the like, if the blades of the curtain positioned on the photo lens side are blackened through surface processing such as anodization or oxidation, or if FRP is used. It is preferable to use FRP, since surface processing is not needed to blacken the surface.

The embodiments of the present invention will be described below with reference to the drawings.

Figure 1:
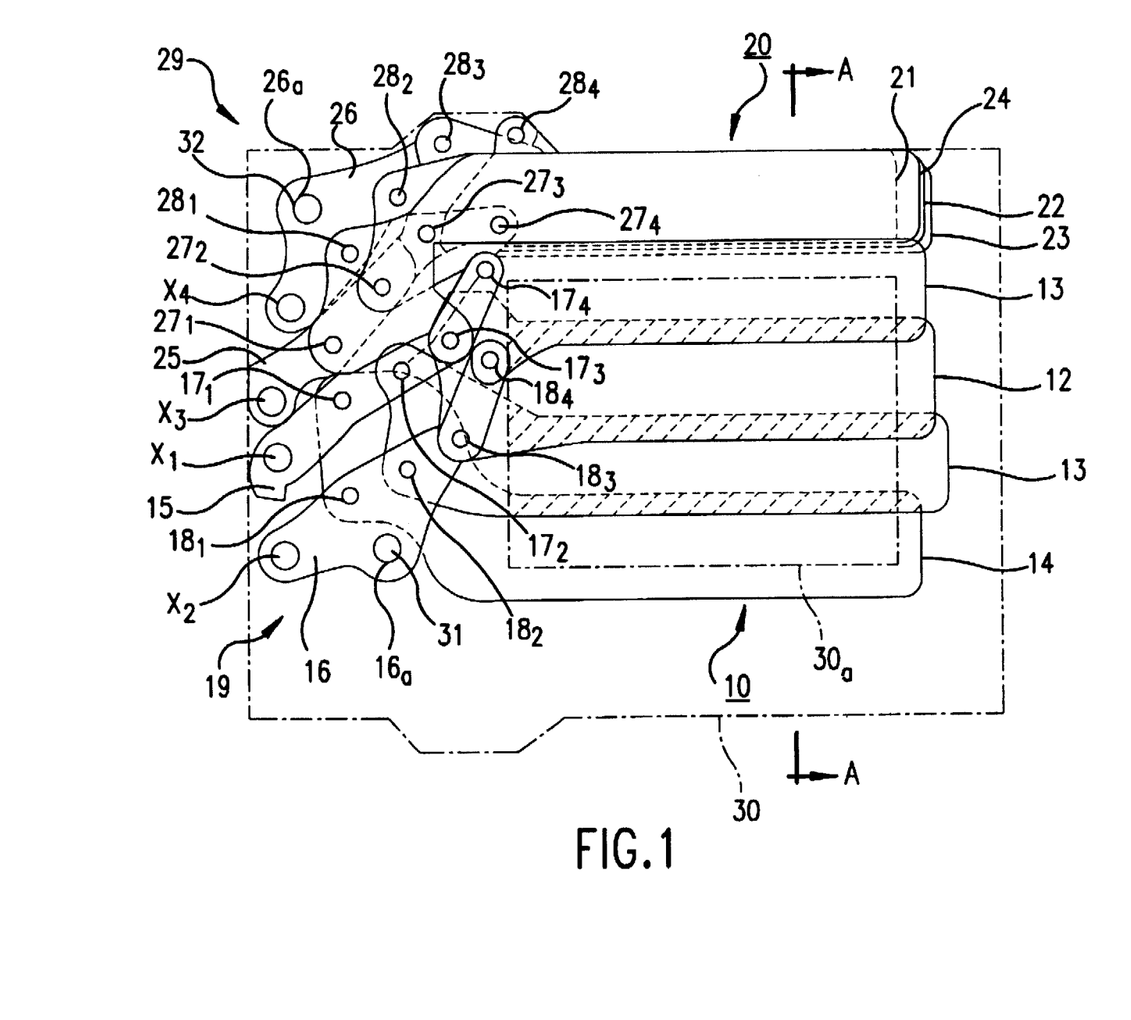
FIG. 1 is a frontal view that shows an embodiment of the focal plane shutter of the present invention.
Figure 2:
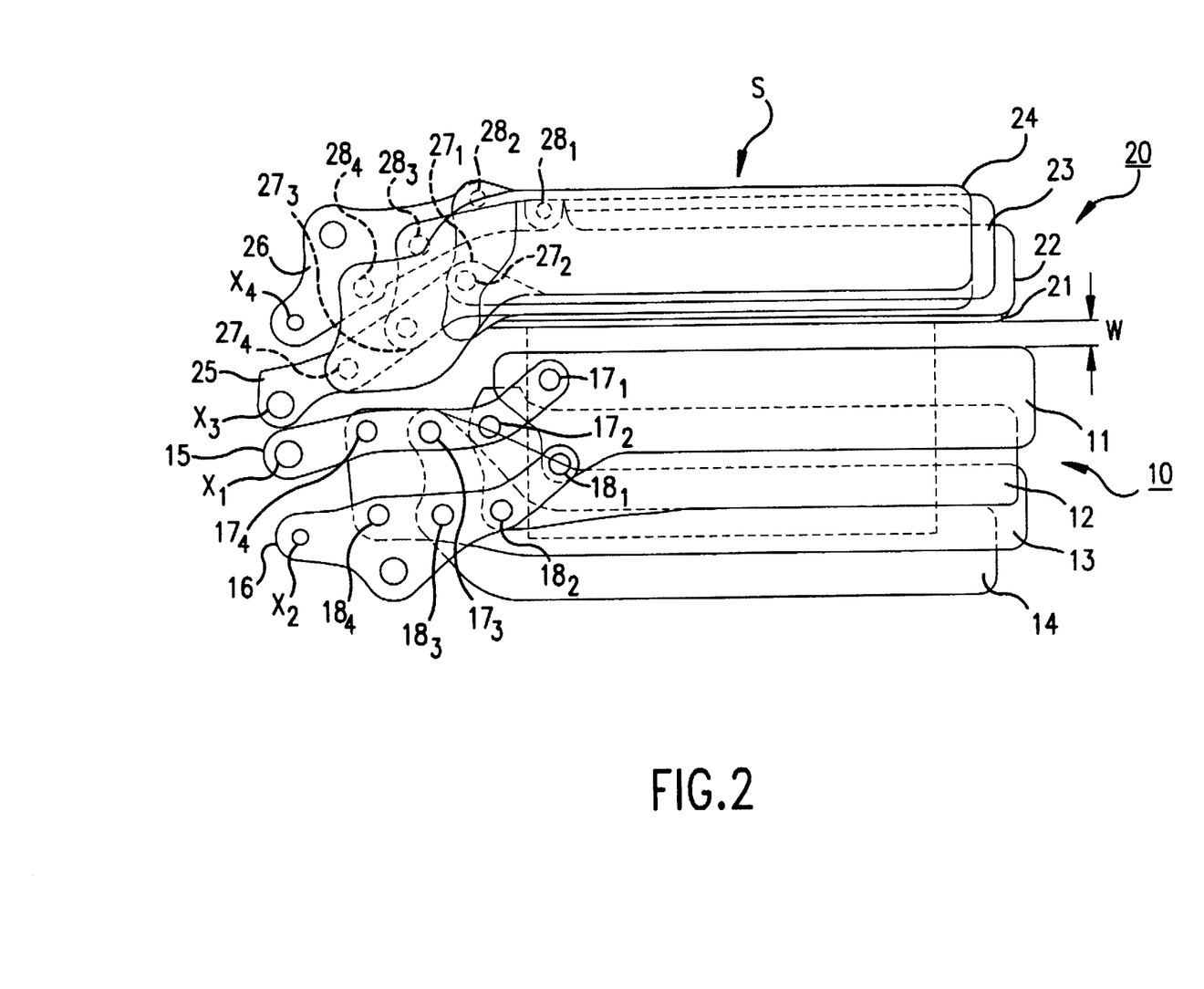
FIG. 2 is a frontal view that shows an embodiment of the focal plane shutter of the present invention.
Figure 3:
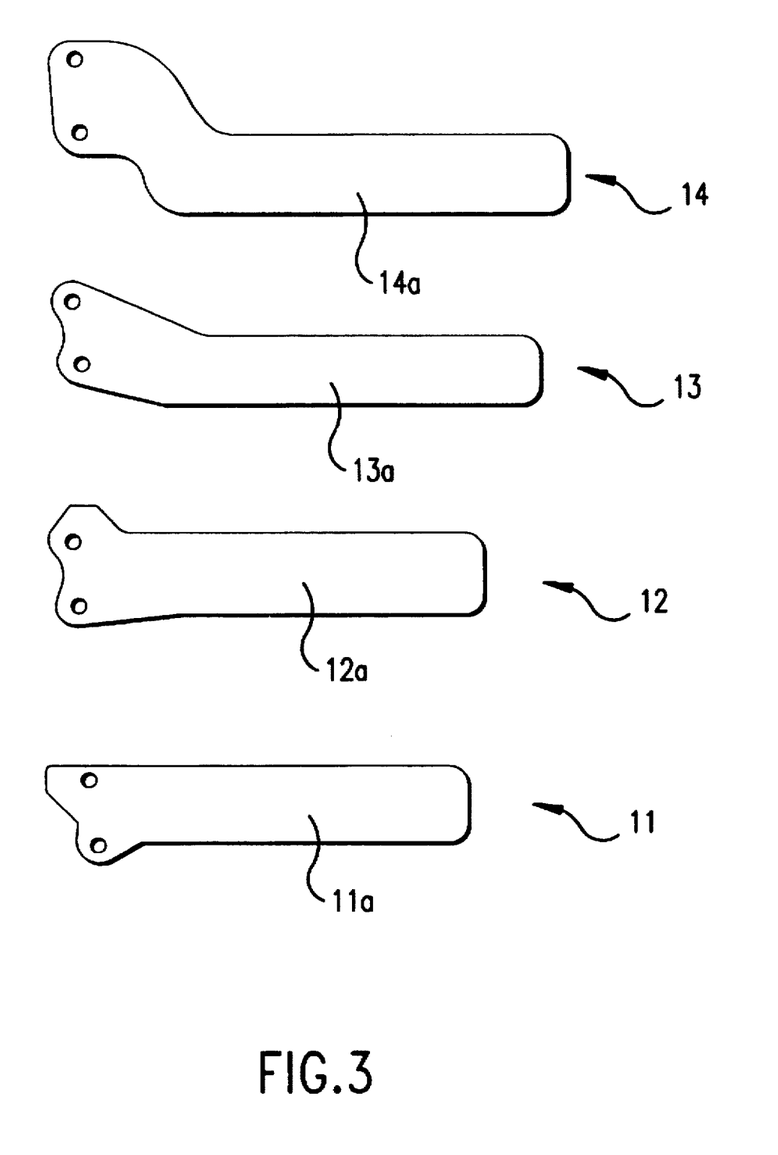
FIG. 3 is a frontal disassembled view that shows an embodiment of the focal plane shutter of the present invention.
Figure 4:
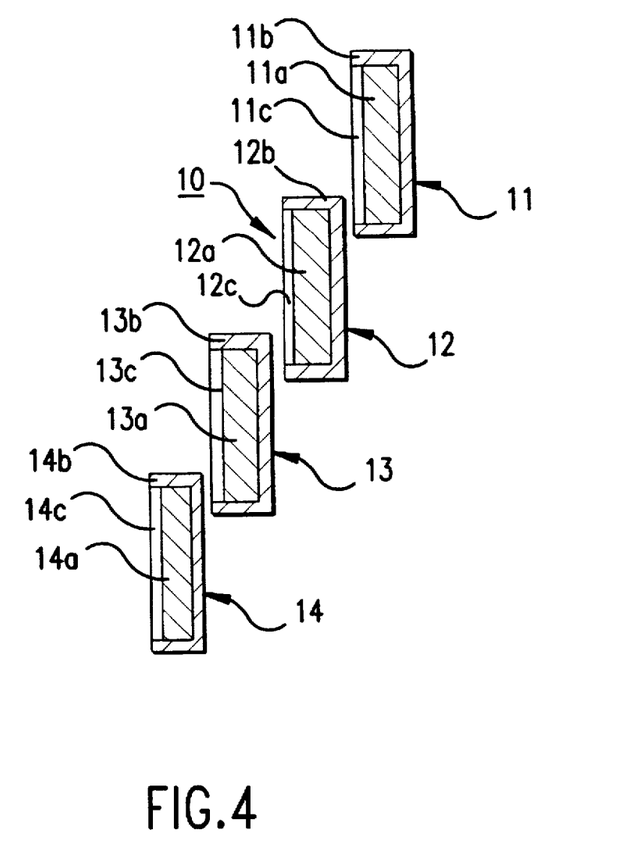
FIG. 4 is a rough cross section that shows an embodiment of the focal plane shutter of the present invention.
Figure 5:
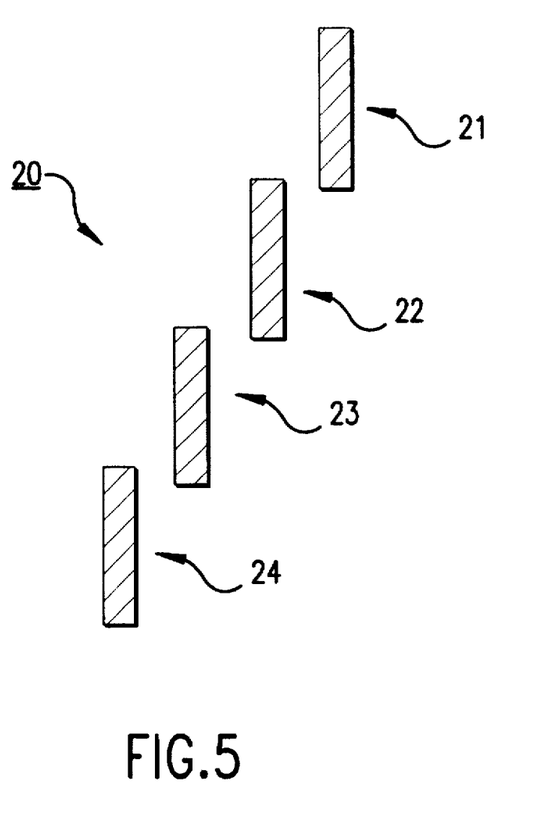
FIG. 5 is a rough cross section that shows an embodiment of the focal plane shutter of the present invention.
Figure 6:
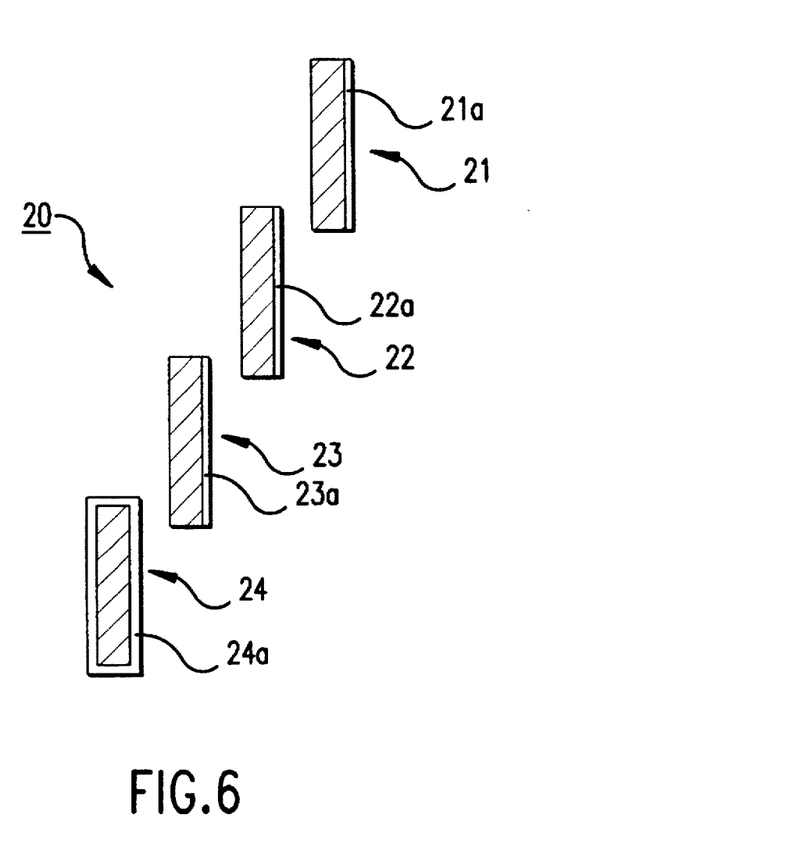
FIG. 6 is a rough cross section that shows an embodiment of the focal plane shutter of the present invention.

FIG. 1 is a frontal view that shows the first embodiment of the focal plane shutter of the present invention. FIG. 2 is a frontal view that shows the moved condition of the front curtain and rear curtain during slit exposure. FIG. 3 is a frontal disassembled view of the dividing blades, and FIG. 4, FIG. 5 and FIG. 6 are rough cross sections of the dividing blades.

The focal plane shutter comprises a front curtain 10, a rear curtain 20, and a shutter base plate 30. The front curtain 10 preferably comprises four dividing blades 11–14. The arms 15 and 16 support the dividing blades 11–14. The arms 15 and 16 are connected to shafts $X_1$ and $X_2$, which are attached to the shutter base plate 30, in a manner which allows the arms 15 and 16 to rotate. The dividing blades 11–14 are each connected to arm 15 and to arm 16 by pins $17_1$–$17_4$ and pins $18_1$–$18_4$, in a manner which allows the blades to rotate. A driving shaft 31 is attached into the hole 16a of the arm 16. The driving shaft 31 receives the driving force from a commonly known shutter driving device during shutter driving and opens and closes the front curtain 10.

Similarly, the rear curtain 20 comprises four dividing blades 21–24. Arms 25 and 26 support the dividing blades 21–24. The arms 25 and 26 are connected to shafts $X_3$ and $X_4$, which are attached to the shutter base plate 30, in a manner which allows the arms to rotate. The dividing blades 21–24 are each connected to arm 25 and to arm 26 by pins $27_1$–$27_4$ and pins $28_1$–$28_4$, in a manner which allows the blades to rotate. A driving shaft 32 is attached into the hole 26a of the arm 26. This driving shaft 32 receives the driving force from a commonly known shutter driving device during shutter driving and opens and closes the rear curtain 20. Arms 15 and 16, arms 25 and 26, shafts $X_1$–$X_4$, self-locking pins 17 and 18, pins 27 and 28, and the driving shafts 31 and 32 form driving mechanisms 19 and 29, which move the dividing blades 11–14 and 21–24, respectively.

The shutter curtains operate as follows. First, describing the front curtain, the blades 11a–14a are formed by stamping specified blade shapes from FRP. A whitening coating of 3 to 6 μm is then applied to the surface of blades 11a–14a on the photo lens side (FIG. 4), forming high reflectivity components 11c–14c, after which a blackening coating of 3–6 μm is applied to the surface of blades 11–14 on the film side and to the edge surfaces of the slit side, forming low reflection rate components 11b–14b. The reflection ratio of the whitening coating is 7 to 30%. The reflection ratio of the blackening coating is below 15%, and preferably below 9%, and even more preferably below 6%. Arms 15 and 16 are connected to the dividing arms 11–14, completing the front curtain.

For the rear curtain, too, specified blade shapes are stamped from FRP, but the blades 21–24 are formed without a coating applied (FIG. 5). As with the front curtain, the arms 25 and 26 are connected to dividing arms 21–24, completing the rear curtain. These components are assembled onto the shutter base plate 30, completing the focal plane shutter S shown in FIG. 1.

FRP, lightweight metals such as titanium, aluminum alloy and the like, plastic, or lightweight ceramics can be used as the material of the light shielding blades (dividing blades 11–14 and 21–24). FRP is the abbreviation for fiber reinforced resin or plastic, and includes fibers and a matrix resin. For the fibers, in addition to continuous carbon fibers, continuous aromatic group polyamide fibers, continuous super-high molecular weight polyethylene fibers, or the like can be used. In particular, fibers other than carbon fibers can be used in intermediate layers. In addition, continuous fibers need not be used in the middle layer in 3-layer construction (including a surface-side layer, a middle layer, and a back surface-side layer), and short fibers may be used instead.

The matrix resin materials include: (1) a thermal plastic resin such as celluloid, cellulose acetate, cellulose propionate, cellulose butylate, 6-nylon, 6,6-nylon, ABS, AS resin, high density polyethylene, polypropylene, polyacetol, polycarbonate, polyethyleneterephthalate, polybutyleneterephthalate, polyetherketone, polyether-ether-ketone, polysulfone, polyethersulfone, polyether-imide, polyacrylate, polyamide-elastomer, ionomer, liquid crystal polymer, polyimide, polyamide-imide, fluorine resin, PPS, denatured polyphenylene oxide, or the like; or (2) a thermal hardening resin such as epoxy resin, unsaturated polyester, polyurethane, polyimide, or the like.

When carbon fibers are used, because the carbon fibers are black, the FRP has a light-shielding characteristic. However, in order to increase the light-shielding characteristic, when prepreg sheets are manufactured, carbon black may be added to and dispersed in a liquid resin. This is an intermediate material in matrix resins. Alternatively, the liquid resin with carbon black mixed in at a high density may be specially prepared and pressed into a normal prepreg sheet using a roll coater or the like. Carbon black is effective in improving the slickness of the blades. If the blades are slippery, friction is small even if the blades temporarily rub together.

It is preferable for the carbon black to have an average particle diameter of less than 0.07 μm, or even more preferable, less than 0.01 μm. The proportion of the carbon black in the liquid resin should be 3–15% by weight. Above 15%, the alignment of the fibers becomes poor, causing adverse influences on the flatness. Also, because fluidity of the liquid resin becomes poor, air pockets can develop and separation can occur between layers. The proper amount of resin in a prepreg sheet is 30–50% by weight, or more specifically, 38–48%. If the amount of resin is too low, air pockets and/or hairline cracks become externally visible, and the coatability worsens. Furthermore, because dips and bumps occur on the surface of the material, the friction durability and lubrication of the blades are decreased, and the appearance worsens even further. In addition, if the amount of resin is too low, when the resin flows, a striped pattern will appear, which also worsens the external appearance.

The amount of fibers in a prepreg sheet (the number of grams of fibers per 1 m$^2$) is 10 g/m$^2$–60 g/m$^2$. The thickness of 1 layer of a prepreg sheet is 15–70 μm. It is not necessary that all prepreg sheets have the same thickness. If the sheets are symmetrical about a neutral plane in the thickness direction, it is possible to combine various thicknesses and various fiber amounts. If the thickness falls in the established range, it becomes more advantageous to increase the thickness or amount of fiber in the intermediate layers in order to increase the overall bending rigidity.

Prepreg sheets are formed so that the direction of the fibers in the surface layers and intermediate layers is perpendicular to the direction of the fibers in the adjacent layers, and so that the sheets are symmetrical about a central plane in the thickness direction. At least three or more layers, for example, three, four, or five layers, are put together, and heated and pressed together. Thus the unhardened thermal vulcanizing resin liquid becomes hardened. An FRP-type plate material (having a thickness of about 70–120 μm) is thereby obtained.

Various materials are next stamped into specified light shielding blade shapes (refer to FIGS. 1 and 2). About 20–40 blades can be stamped from one sheet of material. In the case of FRP, the stamping is carried out in such a manner that the direction of the continuous fibers of the surface layers coincides with the lengthwise direction of the blades. When the blades are cut out, it is common to make a hole in the same manner through which to pass a connecting pin.

In the case of TTL multi-pattern light adjustment, light shielding blades that have been cut out are, for example, coated with a high reflectivity coating on the front curtain. A low reflection rate coating is applied to the edge surfaces, especially to the edge surface of the first blade that forms the slit. It is efficient to gather the blades, set the blades in a jig or the like, and apply the low reflection rate coating to only the slit side edge surfaces.

If the edge surface of the first blade which forms the slit has a high reflection rate coating, or if a highly reflective base material such as aluminum alloy or titanium is exposed, non-uniformities can easily occur in the diffused reflection in the slit, and exposure irregularities can occur. It is hypothesized that this is because the dispersion reflection rates of highly reflective coatings differs according to the wavelength.

In the case of FRP-type blades, since the dispersion reflection rate of the FRP itself is less than 6%, there is no problem if the FRP itself is exposed. The dispersion reflection rate of a high reflection coating is 7–30%, and the dispersion reflection rate of a low reflection coating is below 15%, or preferably, below 6%. Furthermore, FRP-type blades are used for the rear curtain, and no coating is applied. Even if the blades are not coated with a low reflection coating, the dispersion reflection rate of the plastic itself is less than 6%, so no light leaks between the curtains, and there is no particular problem with moveability.

Durability testing was conducted on a focal plane shutter S with the structure described above and on a focal plane shutter which was made using conventional blades with a black coating for the rear curtain. On the conventional focal plane shutter, the presence of light leaks between the curtains and/or second coat sticking conditions of the coating were observed between 50,000 and 100,000 cycles. One out of ten tests revealed light leaking between the curtains, and all ten showed second coat sticking of the coating. However, on the focal plane shutter S, no presence of light leaks between the curtains or second coat sticking condition of the coating was observed, even when the testing exceeded 100,000 cycles. In addition, no abnormalities were observed in the travelling of the blades.

In addition, when the acceptance rate of the dividing blades of the rear curtain was measured, an improvement of approximately 20% was achieved over conventional methods. In other words, approximately 20% of the external appearance defects, membrane thickness defects, warping defects and the like that occur in the conventional coating process completely disappeared.

Furthermore, since the coating process itself was eliminated, an appreciable cost savings was obtained. In addition, since the thickness of a single blade was reduced by the membrane thickness of approximately 10 μm, and since this membrane thickness reduction adds up to approximately 40 μm when four blades are combined, a reduction in the charge energy was also obtained.

As a comparison, the measured blade acceptance rates for conventional FRP-type blades and aluminum alloy blades are shown in Table 1, along with the results when the blades were actually assembled into a shutter and caused to travel at speeds of 1/8000 second and 1/12000 second. The charge energy ratios are also shown.

TABLE 1

|  | First and Second Embodiments | Third Embodiment | Fourth Embodiment | Fifth Embodiment | Comparison Example CFRP Blade | Comparison Example Aluminium Blade Durability Testing |
|---|---|---|---|---|---|---|
| Testing at 1/8000 second | No abnormalities up to 150,000 cycles | No abnormalities up to 150,000 cycles | No abnormalities up to 150,000 cycles | No abnormalities up to 150,000 cycles | 1 abnormality in 50,000 to 100,000 cycles; standard abnormality is 10 | Abnormalities occurred at 20,000 to 50,000 cycles |
| Testing at 1/12000 second | Abnormalities occurred at 50,000 to 100,000 cycles | No abnormalities up to 100,000 cycles | No abnormalities up to 100,000 cycles | No abnormalities at 50,000 to 100,000 cycles | Abnormalities occurred at 20,000 to 50,000 cycles | Abnormalities occurred at Several thousand cycles |
| Blade Acceptance Rate | 70 to 80% | above 90% | 80 to 90% | 60 to 70% | 50 to 60% | above 80% |
| Charge Energy Ratio | 0.98 | 1 | 1.01 | 0.99 | 1 | 1 |

"Abnormalities" refer to blade damage, irregularities in traveling, changes in shutter speed, light leaking between the curtains, and abnormalities in the functioning of the shutter originating in the light-shielding blade.

"Standard abnormality" refers to a condition which does not adversely affect the functioning of the shutter, such as when a second coating sticks, but which is nevertheless undesirable.

The second embodiment of the focal plane shutter of the present invention will be described next. With the second embodiment, FRP is used for the blades 21–23, which are the blades among the dividing blades of the rear curtain that have the first, second, and third largest amounts of movement. The coating is eliminated from these blades. Aluminum alloy is used for the fourth blade 24, which has the least amount of movement, and a black coating is applied. This means that aluminum alloy, which is less costly, is used for the last blade 24, which has the least amount of movement, as a result of its large shape, as can be seen in FIG. 2.

Other than aluminum alloy being used and a black coating being applied to the fourth blade 24, the second embodiment is the same as the first embodiment. The acceptance rate was measured for the second embodiment, too, and listed in Table 1. As can be seen from Table 1, the second embodiment is functionally the same as the first embodiment, and by decreasing the use of FRP, the overall cost can be reduced.

A third embodiment of the focal plane shutter of the present invention will be described next. In the third embodiment, the thickness of the FRP used for the blades 21–23, which have the first, second, and third largest amounts of movement among the dividing blades of the rear curtain, is increased by the amount that the thickness has decreased through the elimination of the coating, thus increasing the rigidity of the blades. Otherwise, the third embodiment is the same as the second embodiment. The acceptance rate was measured for the third embodiment, too, and is listed in Table 1. As can be seen from Table 1, the acceptance rate improved through elimination of the coating, warping defects decreased by increasing the rigidity of the blade material, and the acceptance rate improved by at least 10% compared with the second embodiment. As can be seen from Table 1, the acceptance rate is improved, the occurrence of abnormalities such as light leaking between the curtains or the like is prevented, and the third embodiment can contribute to the implementation of a super-high speed shutter with speeds exceeding ⅛₀₀₀ second.

The fourth embodiment of the focal plane shutter of the present invention will be described next. In this fourth embodiment, a black coating 21a–23a (see FIG. 6) of thickness 3 to 6 µm is applied to the surface on the lens side of the blades 21 to 23, which are the blades among the dividing blades of the rear curtain that have the first, second and third largest amounts of movement. No coating is applied to the surface on the film side. Otherwise, this embodiment is the same as the third embodiment.

The plate thickness of blades 21–23 is the same as for those used in the third embodiment. Consequently, although the blades are thickened somewhat by the thickness of the coating on one side, the increase in the thickness of the blades 21–23 is about 15 µm total in comparison with the third embodiment, and hence the problems of the blade chamber becoming narrow and resistance to blade movement do not occur. In addition, because the coating is applied to only one side, warping of the blades through the internal stress of the coating is a concern, but is not a significant factor in the fourth embodiment. Also, because a coating is applied to one side, defects may be caused in the above-described coating process and the acceptance rate may worsen by about 10% in comparison to the third embodiment. In contrast, when compared to blades in which both surfaces have been coated, the acceptance rate can be improved by 10% because the coating is applied to only one side.

In addition, as noted above, even if a coated surface and an uncoated surface rub together and the coating powder is peeled off, the coating powder does not stick to the surface of the blade which has not been coated, and hence the problem of light leaking between the curtains does not occur. One merit of this embodiment is that even if the user removes the lens and views the shutter curtains with the mirror in a raised state, the curtains have a clean appearance because the external view of the blades is the coated surfaces, so that the user can feel at ease. In other words, this embodiment has the merit that the user will be assured of the high quality of the camera's shutter mechanism.

The fifth embodiment of the focal plane shutter of the present invention will be described next. In the fifth embodiment, a black coating 21a–23a (see FIG. 6) of thickness 3 to 6 μm is applied to the surface on the lens side of the blades 21 to 23, which are the blades among the dividing blades of the rear curtain that have the first, second and third largest amounts of movement. No coating is applied to the surface on the film side. Otherwise, this embodiment is the same as the second embodiment.

The plate thickness of the blades used for the blades 21 to 23 is the same as for those used in the second embodiment. The blade thicknesses differ between the fifth embodiment and the fourth embodiment, but FIG. 6 is used to described both because the external appearance of both is as shown in FIG. 6.

In this fifth embodiment, because the coating is applied to only one side, warping of the blades through the internal stress of the coating was a concern, but as with the fourth embodiment, was not a significant factor. However, because a coating is applied to one side, defects may be caused in the above-described coating process and the acceptance rate may worsen by about 10% in comparison to the second embodiment. In contrast, when compared to blades in which both surfaces have been coated, the acceptance rate can be improved by 10% because the coating is applied to only one side.

In addition, as noted above, even if a coated surface and an uncoated surface rub together and the coating powder is peeled off, the coating powder does not stick to the surface of the blade which has not been coated, and hence the problem of light leaking between the curtains does not occur. One merit of this embodiment is that even if the user removes the lens and views the shutter curtains with the mirror in a raised state, the curtains have a clean appearance because the external view of the blades is the coated surfaces, so that the user can feel at ease. In other words, this embodiment has the merit that the user will be assured of the high quality of the camera's shutter mechanism.

As described above, with the focal plane shutter of the present invention, a front curtain and a rear curtain are provided that each include multiple dividing blades, with at least one of the dividing blades of either the front curtain or rear curtain positioned on the photo lens side being formed from a black material. Because the structure is such that no coating is applied to at least one surface of at least one blade, it is possible to easily and economically provide an extremely durable, super-high speed shutter with speeds exceeding 1/8000 second by increasing the blade acceptance rate, reducing the cost, preventing abnormalities such as light leaking between the curtains and the like, contributing to the implementation of a super-high speed shutter with speeds exceeding 1/8000 second, corresponding to TTL multi-pattern light adjustment, and the like.

In addition, because the charge energy can be reduced, the electrical capacity can be used for purposes other than driving the shutter, additional functions can be added to the camera.

The invention has been described with reference to the above described preferred embodiments, which are meant to be illustrative, not limiting. Various modifications can be made without departing form the spirit and scope of the invention as defined in the appended claims.

What is claimed is:

1. A focal plane shutter having a front curtain and a rear curtain each including a plurality of dividing blades, wherein at least one but not all of said dividing blades among one of said front curtain and said rear curtain positioned on a photo lens side of a camera is formed from a black material having at least one uncoated surface and at least one coated surface, and the at least one uncoated surface of the material is positioned such that it is exposed to a film side of the camera during use of the camera.

2. A focal plane shutter according to claim 1, wherein said black material comprises an oxidized black material.

3. A focal plane shutter according to claim 1, wherein said black material comprises a fiber reinforced resin.

4. A focal plane shutter according to claim 1, wherein the front and rear curtain each comprise a slit-forming blade having the largest amount of movement among the dividing blades of the front and rear curtain respectively, and wherein the slit-forming blade among the front curtain and the rear curtain positioned on the photo lens side has at least one uncoated surface.

5. A focal plane shutter according to claim 1, wherein at least one of the dividing blades of the rear curtain has a coated surface on a photo-lens side of the blade.

6. A focal plane shutter according to claim 5, wherein a dividing blade of the rear curtain having the least amount of movement of the dividing blades of the rear curtain is lighter than the remaining dividing blades of the rear curtain.

7. A focal plane shutter according to claim 6, wherein said dividing blade of the rear curtain having the least amount of movement of the dividing blades of the rear curtain comprises at least one coated surface.

8. A focal plane shutter according to claim 1, wherein the dividing blades that are positioned on a photo lens side and which have a first, second and third largest amount of movement among the dividing blades of the front curtain and the rear curtain respectively, have at least one uncoated surface.

9. A focal plane shutter according to claim 1, wherein said rear curtain is positioned on the photo lens side, and the rear curtain does not have a coating applied to any of the surfaces of the dividing blades of the rear curtain.

10. A focal plane shutter having a front curtain and a rear curtain each including a plurality of dividing blades, wherein at least one of said dividing blades among one of said front curtain and said rear curtain positioned on a film side of a camera is formed from a black material, said at least one dividing blade has a first surface facing a lens side of the camera and a second surface facing the film side of the camera, and at least one of said first surface and second surface is coated, and at least one other of said dividing blades among said one of said front curtain and said rear curtain is uncoated.

11. A focal plane shutter according to claim 10, wherein said black material comprises an oxidized black material.

12. A focal plane shutter according to claim 10, wherein said black material comprises a fiber reinforced resin.

13. A focal plane shutter according to claim 10, wherein the plurality of dividing blades includes a slit-forming blade positioned adjacent a slit formed between the front and rear curtains, and wherein no coating is applied to the slit-forming blade that moves the most amount among said dividing blades during shutter operation.

14. A focal plane shutter according to claim 13, wherein no coating is applied to the slit-forming and dividing blades among said front curtain and said rear curtain that are positioned on the film side and that move first, second, and third most amounts among said dividing blades during shutter operation.

15. A focal plane shutter according to claim 10, wherein said rear curtain is positioned toward the film side, and said rear curtain does not have a coating applied to any of its blades' surfaces.

16. A focal plane shutter according to claim 10, wherein said at least one dividing blade includes a coating on a first side thereof, and a second side, opposite said first side, has said uncoated surface.

17. A focal plane shutter comprising:
a front curtain having a plurality of front dividing blades; and
a rear curtain having a plurality of rear dividing blades, said front and rear dividing blades being arranged for movement toward and away from one another to form an exposure gap between the front and rear curtains,
wherein at least one of the dividing blades among a group of dividing blades including said rear dividing blades and said front dividing blades is formed from an uncoated black material, and
said front dividing blades each have a first surface to which a reflective coating is applied, and a non-reflective coating is applied to a second surface, opposite said first surface.

18. A focal plane shutter according to claim 17, wherein said reflective coating is approximately 3–6 μm, and said non-reflective coating is approximately 3–6 μm and is applied to edge surfaces of each of the front dividing blades.

19. A focal plane shutter according to claim 18, wherein a reflection ratio of the reflective coating is 7–30% and a reflection ratio of the non-reflective coating is below 15%.

20. A focal plane shutter according to claim 17, further comprising a front slit-forming blade and a rear slit-forming blade each made of a fiber reinforced plastic material.

21. A focal plane shutter according to claim 20, wherein said fiber reinforced plastic material includes a resin and a fiber, the amount of resin is 30–50% by weight of said fiber reinforced plastic, and the fibers have a unit weight of about 10–60 g/m².

22. A focal plane shutter according to claim 21, wherein said fiber is carbon fiber and carbon black is added to the resin.

23. A focal plane shutter according to claim 22, wherein a proportion of said carbon black in the resin is 3–15%.

24. A focal plane shutter according to claim 17, wherein said rear curtain comprises four blades, three of the four blades that move the first, second and third most amounts having no coating, and a fourth of said blades, which moves the least amount during shutter movement, comprising an aluminum alloy having a black material coating.

25. A focal plane shutter according to claim 17, wherein said rear curtain includes four blades, three of said four blades that move the first, second and third most amounts during shutter operation having no coating, and a fourth of said four blades comprising a coated blade, wherein each of the first three blades has an uncoated thickness substantially equal to a thickness of the coated fourth blade.

26. A focal plane shutter according to claim 17, wherein said at least one blade comprises a slit-forming blade of said rear curtain that is positioned on a film side of a camera.

27. A method for producing a focal plane shutter having a front curtain and a rear curtain positioned on a photo lens side of a camera, each said curtain including a plurality of dividing blades, the method comprising:
forming at least one of said dividing blades among said front curtain and said rear curtain from a black material,
providing an uncoated surface on at least one of a surface on the at least one dividing blade facing a lens side of the camera and a surface on the at least one dividing blade facing a film side of the camera,
assembling the blades into the respective front curtain and rear curtain, and
forming a dividing blade of the rear curtain having a least amount of movement of the dividing blades of the rear curtain to be lighter in weight than the remaining dividing blades of the rear curtain.

28. A method for producing a focal plane shutter according to claim 27, further comprising coating a surface of the dividing blades facing the photo lens side of the camera.

29. A method for producing a focal plane shutter according to claim 27, further comprising facing said at least one uncoated surface towards the film side of the camera.

30. A method for producing a focal plane shutter according to claim 27, further comprising coating at least one surface of the dividing blade of the rear curtain having a least amount of movement of the dividing blades of the rear curtain.

* * * * *